US009052720B2

(12) United States Patent
Chan et al.

(10) Patent No.: US 9,052,720 B2
(45) Date of Patent: Jun. 9, 2015

(54) MOBILE ROBOT

(71) Applicant: MSI COMPUTER (SHENZHEN) CO., LTD., Shenzhen, Guangdong Province (CN)

(72) Inventors: Hoa-Yu Chan, Taipei (TW); Shih-Che Hung, Hsinchu (TW); Yao-Shih Leng, Taipei (TW)

(73) Assignee: MSI COMPUTER (SHENZHEN) CO., LTD., Shenzhen (CN)

( * ) Notice: Subject to any disclaimer, the term of this patent is extended or adjusted under 35 U.S.C. 154(b) by 35 days.

(21) Appl. No.: 14/139,343

(22) Filed: Dec. 23, 2013

(65) Prior Publication Data
US 2014/0324270 A1 Oct. 30, 2014

(30) Foreign Application Priority Data
Apr. 26, 2013 (CN) .......................... 2013 1 0159582

(51) Int. Cl.
| G01C 22/00 | (2006.01) |
| G05D 1/02 | (2006.01) |
| G01S 17/46 | (2006.01) |
| G01S 17/42 | (2006.01) |
| G01S 17/93 | (2006.01) |
| G01S 7/481 | (2006.01) |

(52) U.S. Cl.
CPC .............. G05D 1/0246 (2013.01); G01S 17/46 (2013.01); G01S 17/42 (2013.01); G01S 17/936 (2013.01); G01S 7/4814 (2013.01); G01S 7/4817 (2013.01); Y10S 901/01 (2013.01)

(58) Field of Classification Search
CPC ........ B25J 11/009; B25J 9/16; G05D 1/0227; G05D 1/024; G05D 1/02; G05B 15/00; G05B 19/04; H04N 13/02; G06F 19/00; G06K 9/00
See application file for complete search history.

(56) References Cited

U.S. PATENT DOCUMENTS

| 8,658,911 B2 * | 2/2014 | Cases et al. .................... 174/266 |
| 8,918,209 B2 * | 12/2014 | Rosenstein et al. ........... 700/254 |
| 2012/0182392 A1 * | 7/2012 | Kearns et al. ................... 348/46 |
| 2012/0185094 A1 * | 7/2012 | Rosenstein et al. ........... 700/259 |
| 2013/0226344 A1 * | 8/2013 | Wong et al. .................... 700/258 |
| 2014/0188325 A1 * | 7/2014 | Johnson et al. ................. 701/26 |
| 2015/0073646 A1 * | 3/2015 | Rosenstein et al. ............. 701/28 |

* cited by examiner

*Primary Examiner* — Behrang Badii
(74) *Attorney, Agent, or Firm* — Birch, Stewart, Kolasch & Birch, LLP

(57) ABSTRACT

A mobile robot including a light emitting unit, a processing unit, an optical component, an image sensing unit, a control unit and a moving unit is provided. The light emitting unit emits a main beam. The processing unit diverges the main beam to a plurality of sub-beams. The sub-beams constitute a light covering an area. When a portion of the sub-beams irradiate a first object, the first object reflects the sub-beam and a plurality of reflected beams are reflected. The optical component receives the reflected beams and converges it to a first collected beam. The image sensing unit converts the first collected beam into a first detection result. The control unit calculates depth information according to the first detection result. The control unit activates the relevant behavior of the mobile robot according to the depth information and controls the mobile robot through the moving unit.

25 Claims, 8 Drawing Sheets

MOBILE ROBOT

CROSS REFERENCE TO RELATED APPLICATIONS

This Application claims priority of China Patent Application No. 201310159582.3, filed on Apr. 26, 2013, the entirety of which is incorporated by reference herein.

BACKGROUND OF THE INVENTION

1. Field of the Invention

The invention relates to a mobile robot, and more particularly, to a mobile robot, which is capable of measuring the depth of field quickly and effectively.

2. Description of the Related Art

When a mobile robot moves in an unknown environment, the mobile robot needs to receive detection results generated by sensors. If the detection results are not enough, the movement of the mobile robot may cause unexpected negative consequences.

BRIEF SUMMARY OF THE INVENTION

A mobile robot is provided, comprising a light emitting unit, a processing unit, an optical component, an image sensing unit, a control unit and a moving unit. The light emitting unit emits a main beam. The processing unit diverges the main beam to a plurality of sub-beams. The sub-beams constitute a light covering an area. When a portion of the sub-beams irradiate a first object, a plurality of reflected beams are reflected from the first object. The optical component converges the reflected beams to a first collected beam. The image sensing unit converts the first collected beam into a first detection result. The control unit calculates depth information according to the first detection result. The control unit decides the relevant behavior of the mobile robot according to the depth information and controls the mobile robot through the moving unit. The moving unit moves the mobile robot.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
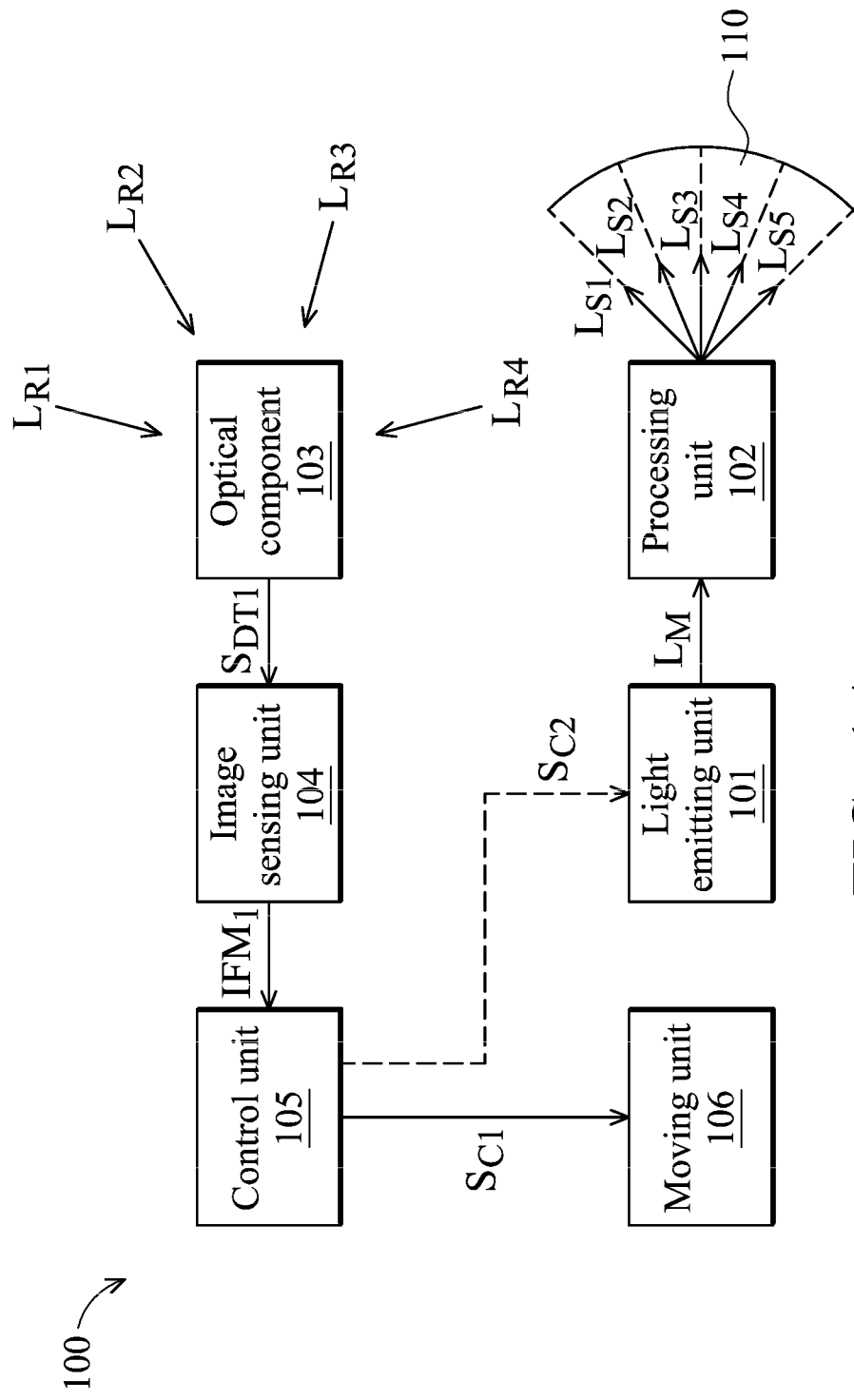
FIG. 1A is a schematic diagram of an exemplary embodiment of a mobile robot according to the invention.

FIG. 1A is a schematic diagram of an exemplary embodiment of a mobile robot according to the invention. The mobile robot 100 comprises a light emitting unit 101, a processing unit 102, an optical component 103, an image sensing unit 104, a control unit 105 and a moving unit 106. In this embodiment, the mobile robot 100 emits a beam similar to a line laser, globally detects an environment to obtain depth information and activates the relevant behavior of the mobile robot according to the depth information.

The light emitting unit 101 emits a main beam $L_M$. The invention does not limit the kind of main beam. In one embodiment, the main beam $L_M$ is visible or invisible. Furthermore, the invention does not limit the circuit structure of the light emitting unit 101. A circuit structure can serve as the light emitting unit 101 if the circuit structure is capable of emitting a beam. In one embodiment, the light emitting unit 101 comprises a laser emitter (not shown) to emit a laser beam.

The processing unit 102 diverges the main beam $L_M$ to a plurality of sub-beams. For clarity, only sub-beams $L_{S1} \sim L_{S5}$ are shown in FIG. 1A. In this embodiment, the sub-beams $L_{S1} \sim L_{S5}$ are a continuous type and constitute a light 110, but the disclosure is not limited thereto. In other embodiments, the sub-beams can be formed as a discrete type. The details of the sub-beams with a discrete type will be described in greater detail with reference to FIG. 2B. The light 110 covers an area. The invention does not limit the sequence of the diverged sub-beams $L_{S1} \sim L_{S5}$. In one embodiment, the sub-beams $L_{S1} \sim L_{S5}$ are sequentially diverged by the processing unit 102. In another embodiment, the sub-beams $L_{S1} \sim L_{S5}$ are simultaneously diverged by the processing unit 102. In other embodiments, the light 110 is similar to a line. When a portion of the sub-beams $L_{S1}$-$L_{S5}$ irradiate an object, the object reflects a portion of the sub-beams $L_{S1} \sim L_{S5}$ and the reflected beams $L_{R1} \sim L_{R4}$ are generated. The invention does not limit the structure of the processing unit 102. A hardware structure can serve as the processing unit 102 if the hardware structure is capable of diverging a main beam into a plurality of sub-beams.

The optical component 103 receives the reflected beam and converges it to a collected beam $S_{DT1}$. For clarity, only the reflected beams $L_{R1} \sim L_{R4}$ are shown in FIG. 1A. The reflected beams $L_{R1} \sim L_{R4}$ come from different directions. In this embodiment, the optical component 103 can globally receive 360 degrees of reflected beams from the environment. The invention does not limit the kind of the optical component 103. In one embodiment, the optical component 103 is a mirror to reflect environmental beams. In another embodiment, the optical component is an omnidirectional lens.

The image sensing unit 104 is connected to the optical component 103 and converts the collected beam $S_{DT1}$ into a detection result $IFM_1$. The invention does not limit how the image sensing unit 104 senses the collected beam $S_{DT1}$. In one embodiment, the image sensing unit 104 utilizes a charge-coupled device (CCD) or a complementary metal-oxide semiconductor (CMOS) to sense the collected beam $S_{DT1}$. Additionally, the invention does not limit the kind of image sensing unit 104. In one embodiment, the image sensing unit 104 is a camera.

The control unit 105 is connected to the image sensing unit 104 and calculates depth information according to the detection result $IFM_1$. The control unit 105 generates a control signal $S_{C1}$ according to the depth information. The control unit 105 sends the control signal $S_{C1}$ to the moving unit 106 and utilizes the moving unit 106 to control the relevant behavior of the mobile robot 100, such as the traveling path of the mobile robot 100. In one embodiment, the moving unit 106 is connected to the control unit 105 and comprises a plurality of wheels (not shown) and a driver (not shown). The driver of the moving unit 106 controls the rotating direction of the wheels according to the control signal $S_{C1}$ such that a relevant behavior of the mobile robot 100 can be adjusted.

In one embodiment, the control unit 105 has at least one predefined relevant behavior. The control unit 105 selects one predefined relevant behavior among the predefined relevant behaviors according to the depth information or a fused result from the past depth information which is memorized in the control unit 105, wherein the selected relevant behavior serves as the relevant behavior of the mobile robot 100. At least one of the predefined relevant behaviors is predefined to activate the mobile robot 100 to move along a straight line or an obstacle, to randomly move, to rotate along a point, to spirally rotate, to move and rotate, to increase speed, to reduce speed, to go backward, or to stop moving.

In another embodiment, the control unit 105 randomly decides a relevant behavior. The control unit 105 decides a single relevant behavior or a combination of various relevant behaviors according to the detection results, weight and/or priority of the sensors. In this case, the relevant behavior decided by the control unit 105 is not a predefined behavior.

In another embodiment, the control unit 105 activates a corresponding relevant behavior according to a control command (not shown). In this case, the control command is directly or indirectly set by a user. In one embodiment, the user directly touches a function button of the mobile robot 100 to adjust the relevant behavior of the mobile robot 100. In another embodiment, the user utilizes a non-contact method, such as a remote controller or a program, to adjust the relevant behavior of the mobile robot 100.

In some embodiments, the relevant behavior decided by the control unit 105 changes the position, the direction, the roll angle, the speed, the angular velocity, the acceleration and the acceleration angular velocity of the mobile robot 100. In other embodiments, the relevant behavior decided by the control unit 105 changes a relation between the mobile robot 100 and at least one surrounding object, or an element state of the mobile robot 100.

In another embodiment, the control unit 105 creates and activates at least one new relevant behavior according to the depth information. In this case, the relevant behavior are not predefined in the mobile robot 100. For example, the control unit 105 utilizes the depth information to obtain a short path, a secure path, a dirty path, a bright path or a dark path and then the mobile robot 100 tracks along the obtained path. The short path means that the mobile robot 100 completes a clean action in the shortest time or minimized energy exhausted rule according to depth information. The secure path means that the mobile robot 100 performs the cleaning action and is not collided with any obstacle. The dirty path is constitute by many dirty areas. The bright path is constituted by many bright areas. The dark path is constituted by many dark areas. In one embodiment, the mobile robot 100 comprises other sensors to detect environment. The control unit 105 is capable of providing new relevant behaviors according to the detection results.

In other embodiments, the image sensing unit 104 converts the collected beam $S_{DT1}$ according to different focal lengths to generate different detection components. The detection components constitute the detection result $IFM_1$. In this case, the control unit 105 obtains an optimum path according to an optimum focal length. For example, each detection result comprises at least one optimum detection component corresponding an optimum focal length. The control unit 105 obtains the optimum path according to various optimum detection components corresponding the optimum focal length.

The invention does not limit the circuit structure of the control unit 105. In one embodiment, the control unit 105 comprises micro-controllers, processors, memories and logic circuits. In other embodiment, the control unit 105 generates another control signal $S_{C2}$ to turn on or off the light emitting unit 101. For example, during a first period, the control unit 105 turns off the light emitting unit 101. At this time, the optical component 103 collects the reflected beams surrounding the mobile robot 100. The image sensing unit 104 converts the beams collected by the optical component 103 into a first detection result. The control unit 105 stores the first detection result. During a second period, the control unit 105 turns on the light emitting unit 101. At this time, the processing unit 102 diverges the main beam $L_M$ to the sub-beams $L_{S1}$~$L_{S5}$. When the sub-beams $L_{S1}$~$L_{S5}$ irradiate an object, the object reflects the sub-beams $L_{S1}$~$L_{S5}$ and the reflected beams $L_{R1}$~$L_{R4}$ are generated. The optical component 103 receives the reflected beams surrounding the mobile robot 100, wherein the reflected beams surrounding the mobile robot 100 comprise the reflected beams $L_{R1}$~$L_{R4}$. The image sensing unit 104 converts the beams received by the optical component 103 into a second detection result. The control unit 105 compares the first detection result with the second detection result to separate the reflected beams $L_{R1}$~$L_{R4}$ from the second result and calculates the distances between the mobile robot 100 and surrounding objects according to the separated result. In this case, the control unit 105 appropriately turns on or off the light emitting unit 101 and calculates the distances between the mobile robot 100 and the surrounding objects according to two detection results. To separate only the reflected beams $L_{R1}$~$L_{R4}$ from the second detection result, it is necessary that the time between the first detection and the second detection is short.

In one embodiment, the optical component 103 is omnidirectional. In other words, the sensing angle of the optical component 103 is 360 degrees. Thus, the optical component 103 is capable of receiving the reflected beams surrounding the mobile robot 100. When the mobile robot 100 enters a narrow area, the control unit 105 adjusts the rotation direction of the wheels according to the result received by the optical component 103 such that the mobile robot 100 can quickly leave the narrow area. Thus, the mobile robot 100 is not mired in the narrow area too long.

Figure 1B:
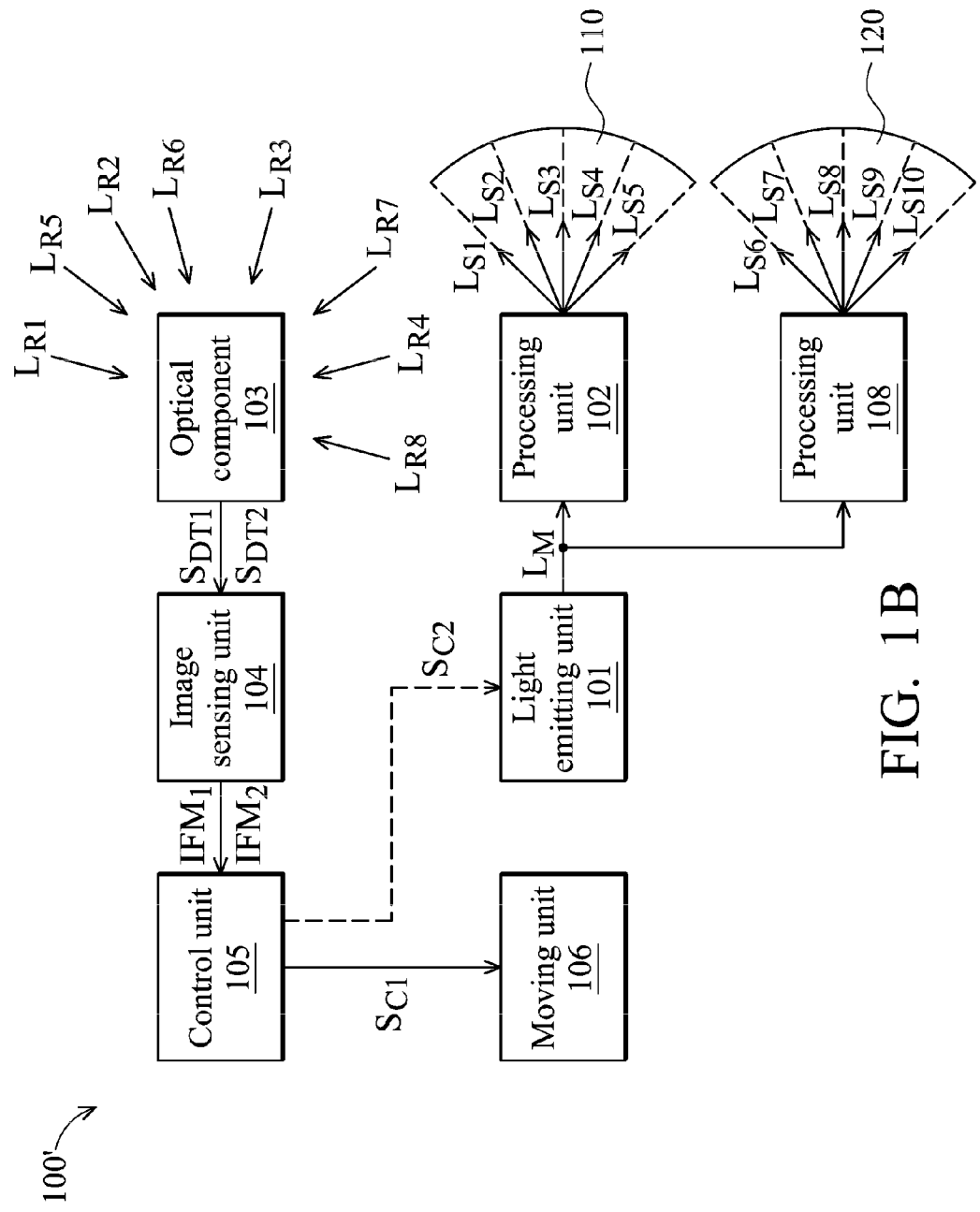
FIG. 1B is a schematic diagram of another exemplary embodiment of a mobile robot according to the invention.

FIG. 1B is a schematic diagram of another exemplary embodiment of a mobile robot according to the invention. FIG. 1B is similar to FIG. 1A except for the addition of a processing unit 108. In this embodiment, the processing unit 108 diverges the main beam $L_M$ to a plurality of sensing beams. For clarity, only sensing beams $L_{S6}$~$L_{S10}$ are shown in FIG. 1b. The sensing beams $L_{S6}$~$L_{S10}$ constitute a light 102 covering an area. The area is covered with the sensing beams $L_{S6}$~$L_{S10}$.

When a portion of the sensing beams $L_{S6}$~$L_{S10}$ irradiates an object, a plurality of ground-reflected beams $L_{R5}$~$L_{R8}$ are reflected. The optical component 103 receives the ground-reflected beams $L_{R5}$~$L_{R8}$ and converges it to a collected beam $S_{DT2}$. The image sensing unit 104 converts the collected beam $S_{DT2}$ into a detection result $IFM_2$. The control unit 105 generates the control signal $S_{C1}$ to adjust the rotation direction of the wheels according to the detection result $IFM_2$.

In one embodiment, when the processing unit 102 diverges the main beam $L_M$ to the light 110, the processing unit 108 stops diverging the main beam $L_M$. Therefore, the light 120 is not formed. Thus, only the reflected beams $L_{R1}$~$L_{R4}$ are received by the optical component 103. In another embodiment, when the processing unit 108 diverges the main beam $L_M$ to the light 120, the processing unit 102 stops diverging the main beam $L_M$. Therefore, the light 110 is not formed. Thus, only the ground-reflected beams $L_{R5}$~$L_{R8}$ are received by the optical component 103. In other embodiments, the processing unit 102 diverges the main beam $L_M$ to the light 110 and the processing unit 108 diverges the main beam $L_M$ to the light 120 at the same time. Thus, the optical component 103 receives and converges the reflected beams $L_{R1}$~$L_{R4}$ and the ground-reflected beams $L_{R5}$~$L_{R8}$.

The invention does not limit the irradiative directions of the lights 110 and 120. In one embodiment, the light 110 diverged by the processing unit 102 is substantially parallel with the ground or floor plane to detect the positions of objects surrounding the mobile robot 100. The processing unit 108 diverges the main beam $L_M$ to the sensing beams $L_{S6}$~$L_{S10}$ toward the ground to detect ground states, such as a rough or uneven ground. The mobile robot 100 utilizes the detection result converted from the reflected beams $L_{R1}$~$L_{R4}$ to avoid the collision with obstacles. Furthermore, the mobile robot 100 utilizes the detection result converted from the ground-reflected beams $L_{R5}$~$L_{R8}$ to avoid falling down.

The invention does not limit the patterns of the lights 110 and 120. In one embodiment, the lights 110 and 120 are plane lights or curved lights. Additionally, the invention does not limit how the lights 110 and 120 be diverged. In this embodiment, the processing units 102 and 108 respectively diverge the main beam $L_M$ emitted by the same light emitting unit 101 to the lights 110 and 120 from. In other embodiments, the processing unit 102 diverges one main beam to the light 110 and the processing unit 108 diverges another main beam to the light 120. In this case, the mobile robot 100' comprises two light emitting units.

Figure 2A:
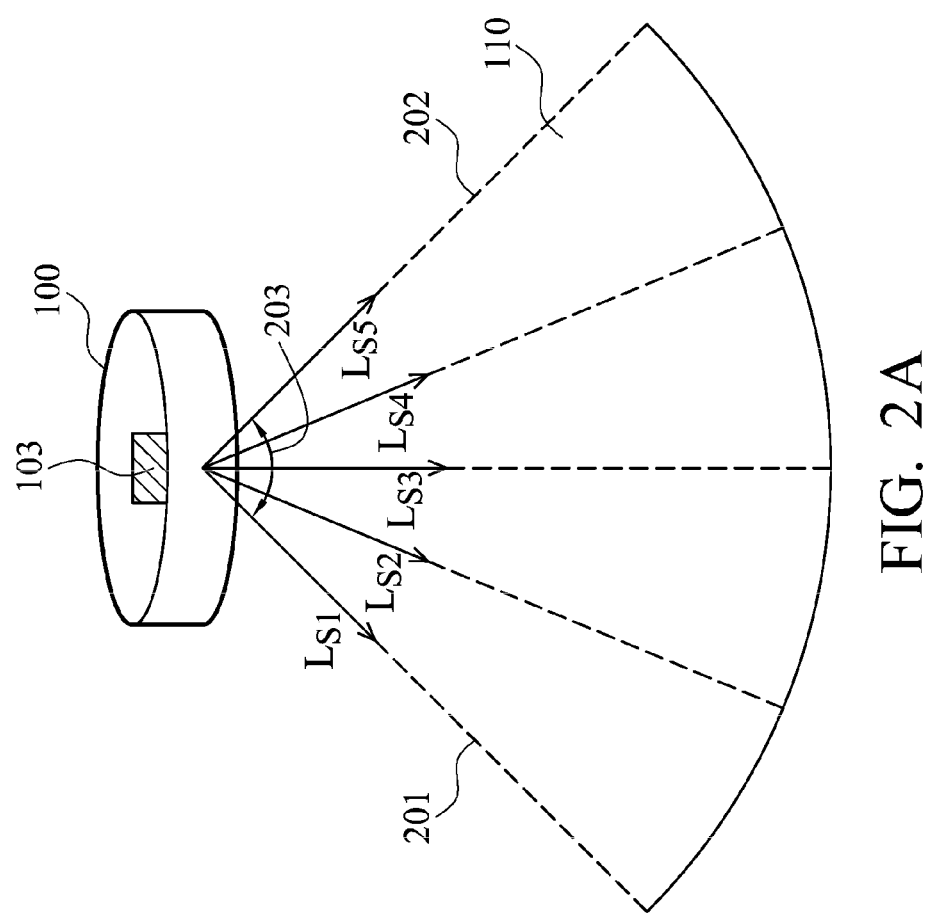
FIG. 2A-2C are front views of exemplary embodiments of a mobile robot according to the invention.

FIG. 2A is a front view of an exemplary embodiment of a mobile robot according to the invention. As shown in FIG. 2A, the mobile robot 100 emits sub-beams $L_{S1}$~$L_{S5}$. The sub-beams $L_{S1}$~$L_{S5}$ constitute a light 110. The light 110 has boundaries 201 and 202. An angle 203 is formed by the boundaries 201 and 202. The invention does not limit the degree of the angle 203. In one embodiment, the angle 203 is over 180 degrees. In another embodiment, the angle 203 approaches 360 degrees.

Figure 2B:
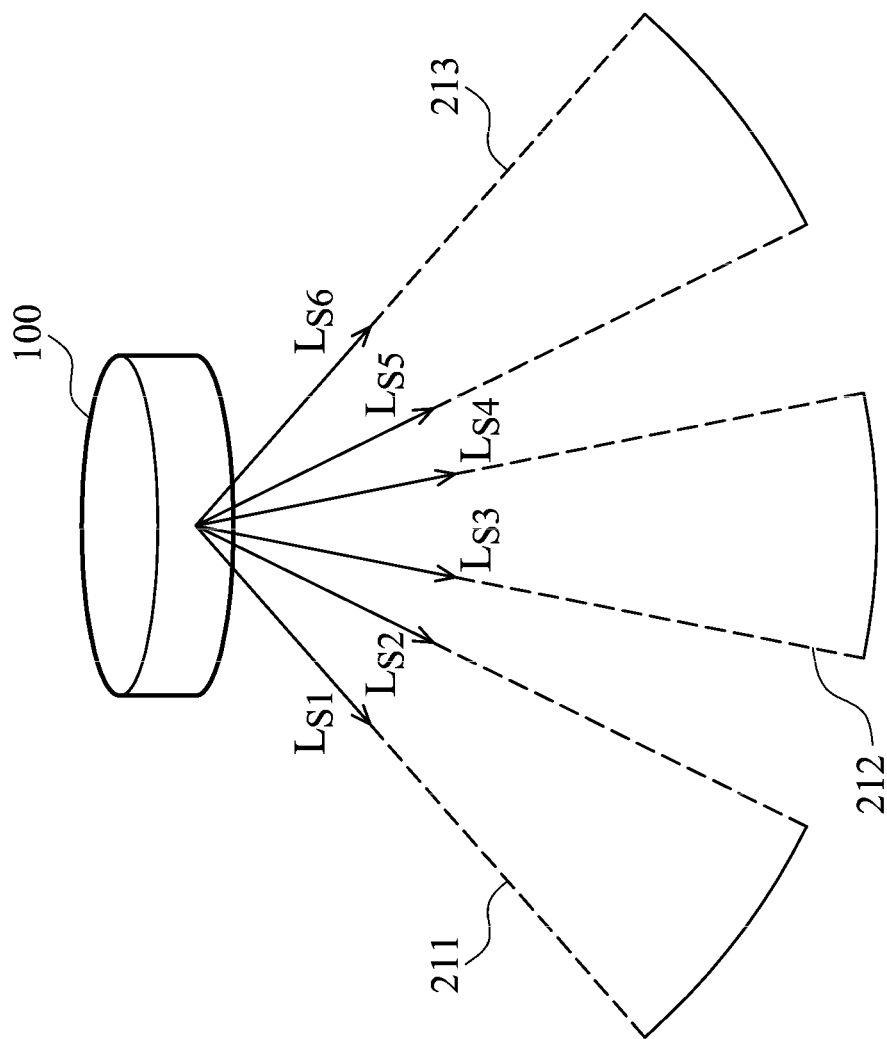

FIG. 2B is another front view of an exemplary embodiment of a mobile robot according to the invention. In this embodiment, the mobile robot 100 emits sub-beams $L_{S1}$~$L_{S6}$. As shown in FIG. 2B, the sub-beams $L_{S1}$~$L_{S6}$ are formed as a discrete type. The sub-beams $L_{S1}$ and $L_{S2}$ constitute a light 211. The sub-beams $L_{S3}$ and $L_{S4}$ constitute a light 212. The sub-beams $L_{S5}$ and $L_{S6}$ constitute a light 213. In this embodiment, the lights 211~213 are extended to different directions. The lights 211~213 are not contacted to each other. In one embodiment, the area covered by the light 211 is the same as the area covered by the light 211. In another embodiment, the area covered by the light 211 is different from the area covered by the light 211.

Figure 2C:
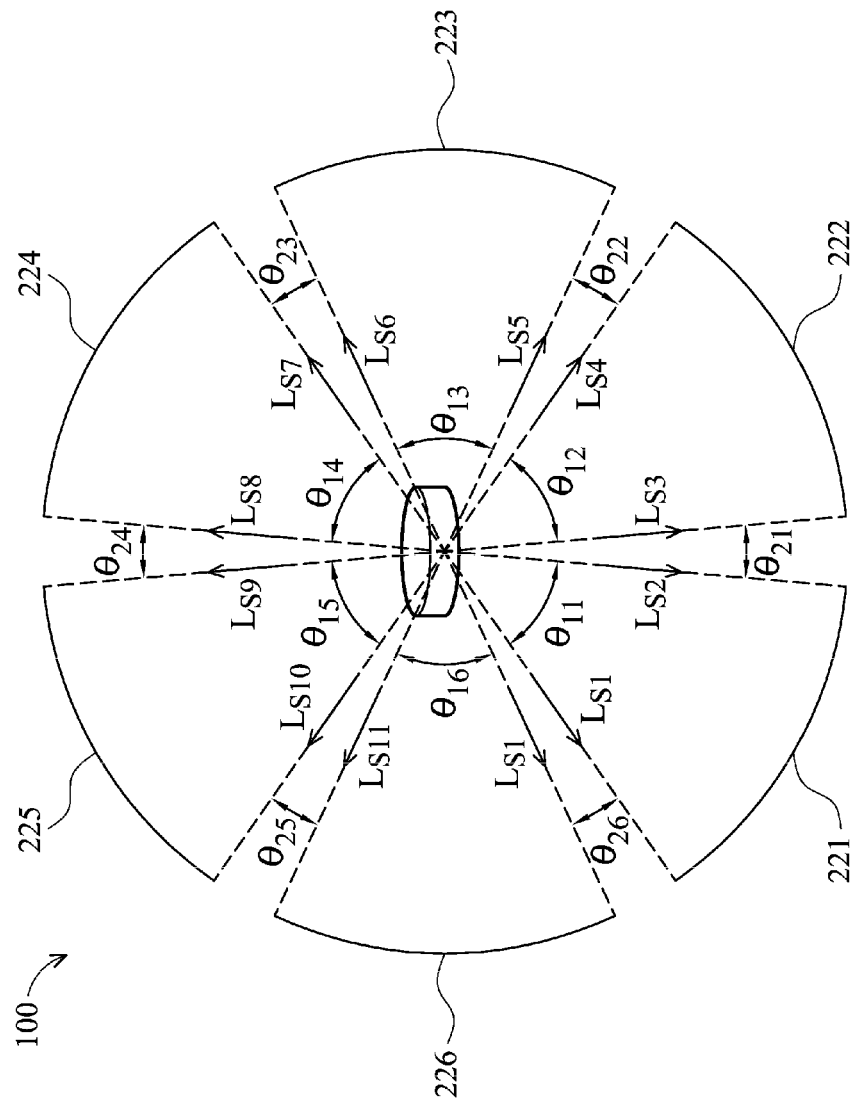

FIG. 2C is another front view of an exemplary embodiment of a mobile robot according to the invention. In this embodiment, the mobile robot 100 emits sub-beams $L_{S1}$~$L_{S12}$. The sub-beams $L_{S1}$~$L_{S12}$ are formed as a discrete type. The sub-beams $L_{S1}$~$L_{S12}$ constitute lights 221~226. The lights 221~226 are extended to different directions. The lights 221~226 are not contacted to each other. In one embodiment, the area covered by one of the lights 221~226 is the same as or different from the area covered by another of the lights 221~226. In another embodiment, the lights 221~226 have dispersed angles $\theta_{11}$~$\theta_{16}$ about 50 degrees. The angles $\theta_{21}$~$\theta_{26}$ are formed between the lights $L_{S1}$~$S_{S12}$. For example, the lights $L_{S2}$ and $L_{S3}$ have an angle $\theta_{21}$ about 10 degrees, and the lights $L_{S4}$ and $L_{S5}$ have an angle $\theta_{22}$ about 10 degrees. In one embodiment, the angles $\theta_{11}$~$\theta_{16}$ are the same, and the angles $\theta_{21}$~$\theta_{26}$ are the same. In other embodiment, one of the angles $\theta_{11}$~$\theta_{16}$ is different from another of the angles $\theta_{11}$~$\theta_{16}$. Similarly, one of the angles $\theta_{21}$~$\theta_{26}$ is different from another of the angles $\theta_{21}$~$\theta_{26}$.

Figure 3:
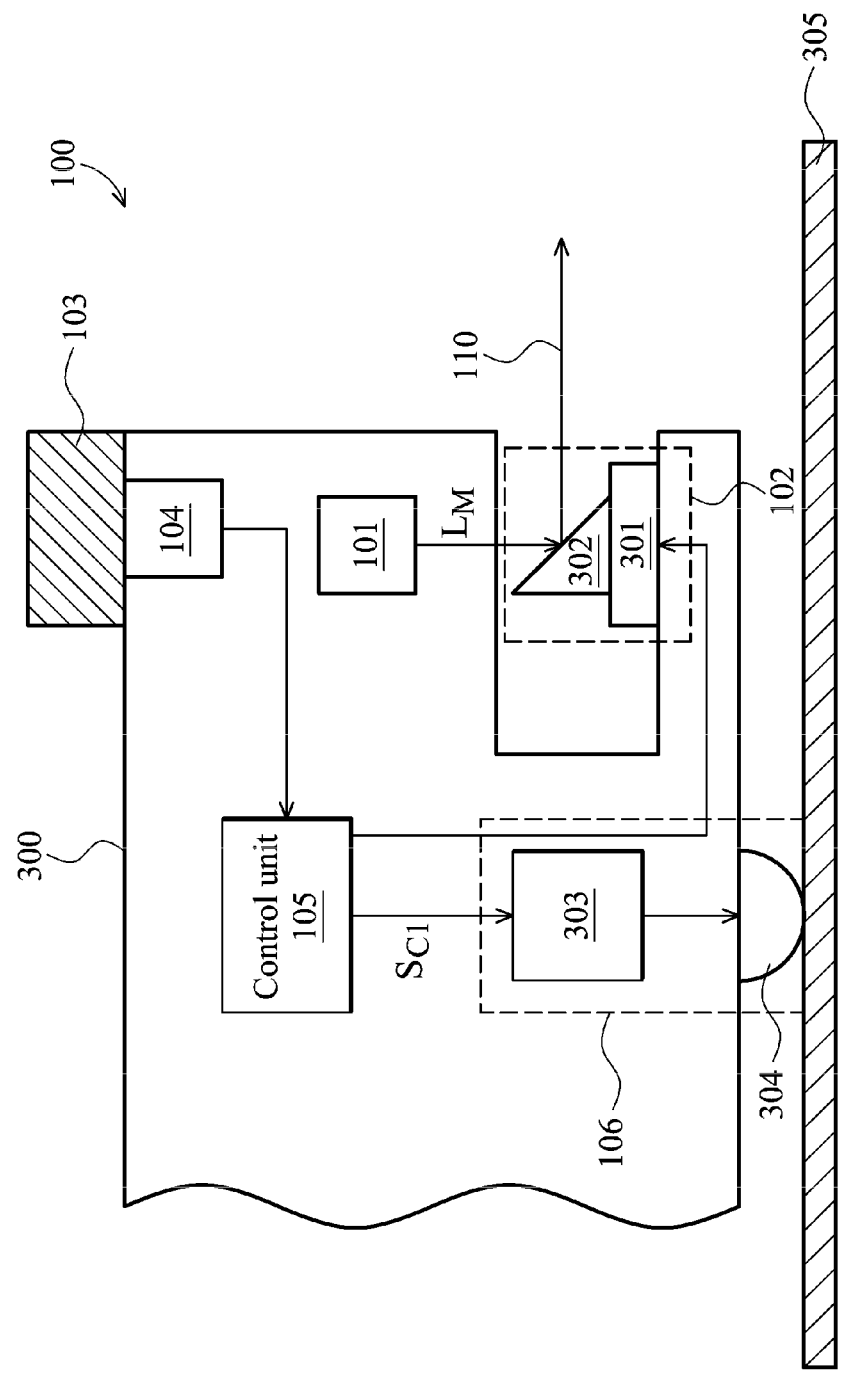
FIG. 3 is a side view of an exemplary embodiment of a mobile robot according to the invention.

FIG. 3 is a side view of an exemplary embodiment of a mobile robot according to the invention. The mobile robot 100 comprises a case 300. The light emitting unit 101 is disposed within the case 300 and emits a main beam $L_M$. The processing unit 102 is disposed on the outside of the case 300 to diverge the main beam $L_M$. In this embodiment, the processing unit 102 reflects the main beam $L_M$ and the reflected beam is sub-beams $L_{S1}$~$L_{S5}$ constituting a light 110. In one embodiment, the light 110 is parallel to the ground 305.

The invention does not limit the internal structure of the processing unit 102. A structure can serve as the processing unit 102 if the structure is capable of diverging a main beam to a plurality of sub-beams. As shown in FIG. 3, the processing unit comprises a base 301 and a mirror 302. The mirror 302 has a slope angle and is connected to a center of the base 301. The invention does not limit the degree of the slope angle. In one embodiment, the slope angle of the mirror 302 is about 45 degrees. In other embodiments, The irradiative direction of the light 110 can be controlled by changing the slope angle of the mirror 302. In one embodiment, the light 110 is irradiated toward the ground 305. In another embodiment, the light 110 covers an area in front of the mobile robot 100 as shown in FIG. 3. In other embodiment, the light 110 is irradiated toward the sky.

In this embodiment, the control unit 105 rotates the base 301. Thus, the mirror 302 reflects the main beam $L_M$, and the reflected beams are diverged into different directions. The reflected beams are referred to as sub-beams. Additionally, the reflected beams reflected by the mirror 302 constitute the light 110. In this case, the mirror 302 sequentially reflects the main beam $L_M$, and the reflected beams are diverged into different direction. In other words, the sub-beams are not simultaneously diverged by the mirror 302.

The optical component 103 is disposed on the case 300 to receive and converge the reflected beams. The invention does not limit the distance between the optical component 103 and the processing unit 102. Only the optical component 103 is not disposed within the irradiative area of the light 110. In other embodiments, when the distance between the optical component 103 and the processing unit 102 is increased, the depth information of a far irradiated object becomes more accurate.

The image sensing unit 104 is disposed within the case 300 and is disposed under the optical component 103 to detect the beam collected by the optical component 103. The control unit 105 generates the control signal $S_{C1}$ according to the detection result converted by the image sensing unit 104. The driver 303 of the moving unit 106 controls the rotation direction of the wheel 304. For clarity, only one wheel is shown in FIG. 3, but the disclosure is not limited thereto. In other embodiments, the mobile robot 100 comprises a plurality of wheels. In this embodiment, the case 300 shows the wheel 304. The wheel 304 is disposed under the case 300.

In other embodiments, the mirror 302 is replaced with a conical mirror. Since the conical mirror is capable of diverging a main beam $L_M$ to a plurality of reflected beams and the reflected beams are diverged to different direction, the control unit 105 does not require a rotatable base. In one embodiment, the base 301 is omitted. Additionally, the conical mirror diverges a main beam to simultaneously generate a plurality of reflected beams.

Figure 4:
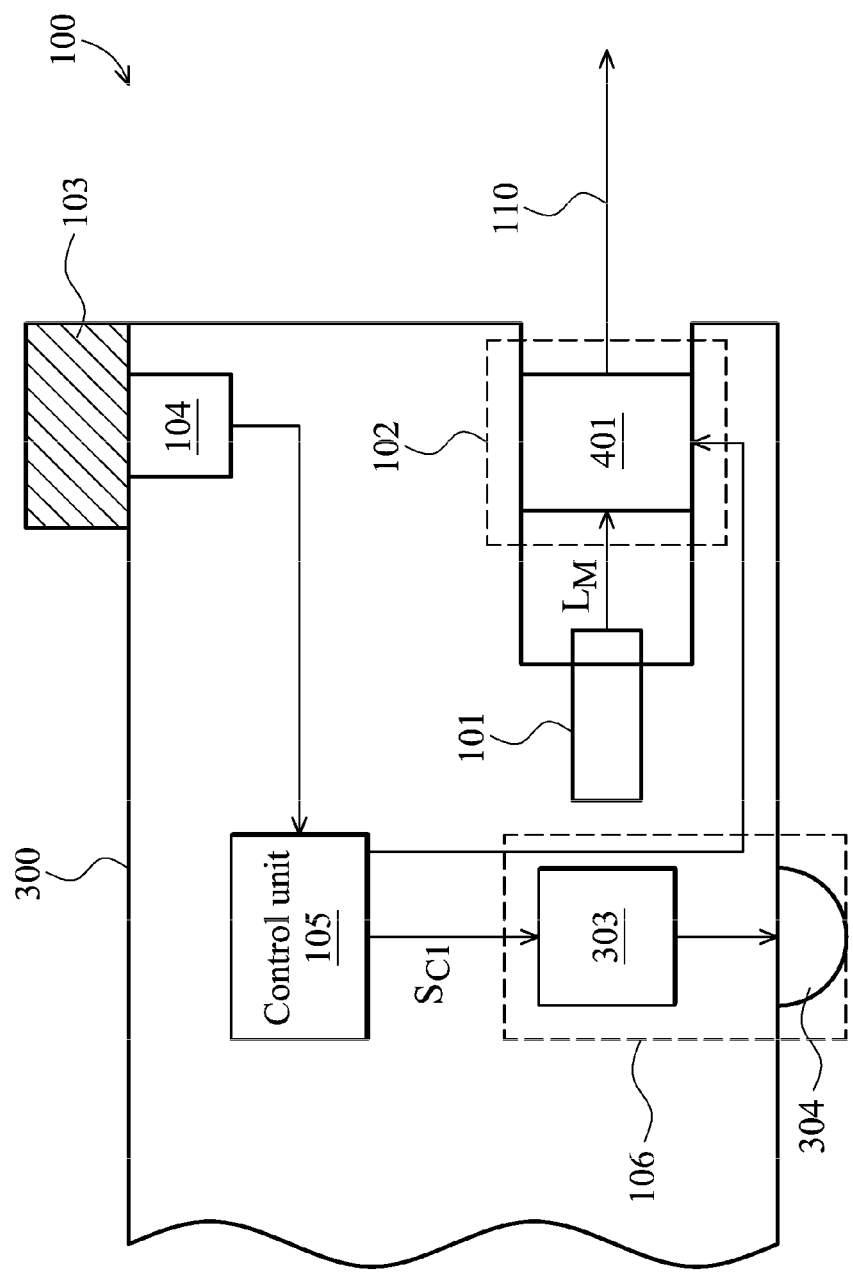
FIG. 4 is a schematic diagram of an exemplary embodiment of a processing unit according to the invention.

FIG. 4 is a schematic diagram of an exemplary embodiment of a processing unit according to the invention. FIG. 4 is similar to FIG. 3 with the exception that the processing unit 102 refracts the main beam $L_M$. Since FIGS. 3 and 4 have the same elements, descriptions of elements in FIG. 4 are omitted, for brevity. In this embodiment, the processing unit 102 is a cylindrical lens 401. The cylindrical lens 401 refracts the main beam $L_M$ to a plurality of dispersed beams, wherein the dispersed beams are diverged to different directions and constitute the light 110. The light 110 has a dispersed angle about 120 degrees. In one embodiment, the cylindrical lens 401 simultaneously diverges the main beam $L_M$ to the dispersed beams.

In another embodiments, a surface of the cylindrical lens is plated a reflective films to increase the dispersed angle of the cylindrical lens 401. Further, the positions of the light emitting unit 101 and the cylindrical lens 401 are adjusted to change the irradiative direction of the light 110. In this embodiment, the light 110 covers the area in front of the mobile robot 100.

The invention does not limit the method of forming the reflective film. In one embodiment, a deposition method is utilized to form a reflective film on the surface of the cylindrical lens 401. The reflective film may be evenly or unevenly formed on the surface of the cylindrical lens 401. For example, the cylindrical lens 401 comprises a surface having a first area and a second area. The first area has a first reflective film. The second area has a second reflective film. In one embodiment, the thickness of the first reflective film may be the same as or different from the thickness of the second reflective film. In other embodiments, the thickness of one surface of the cylindrical lens 401 is the same as or different from the thickness of another surface of the cylindrical lens 401

Figure 5:
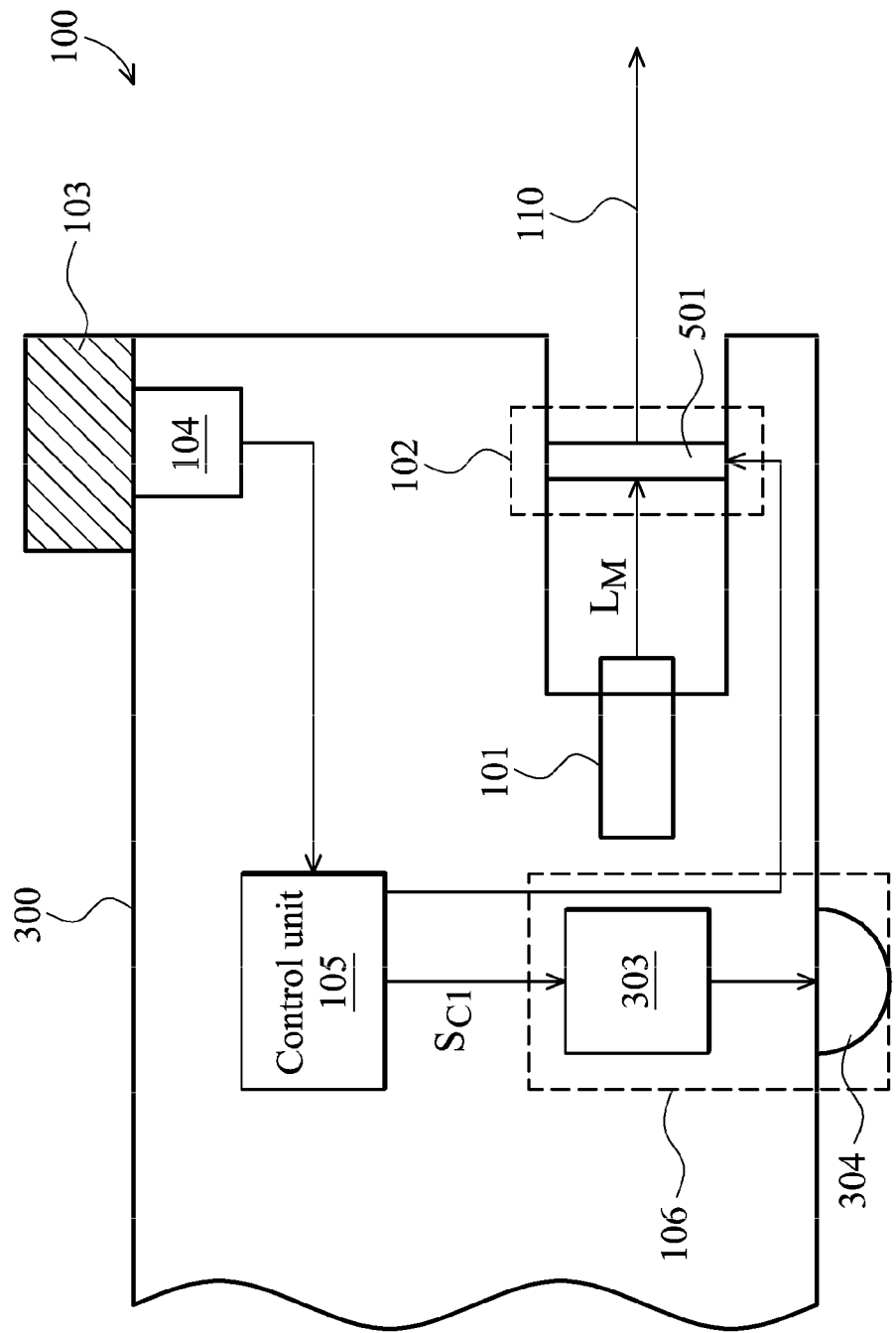
FIG. 5 is a schematic diagram of another exemplary embodiment of a processing unit according to the invention.

FIG. 5 is a schematic diagram of another exemplary embodiment of a processing unit according to the invention. FIG. 5 is similar to FIG. 3 with the exception that the processing unit 102 diverges the main beam $L_M$ in different ways. Since FIGS. 3 and 5 have the same elements, descriptions of elements in FIG. 5 are omitted, for brevity. In this embodiment, the processing unit 102 is a grating lens 501. The grating lens 501 has a specific pattern (not shown) to diffract the main beam $L_M$ to a plurality of sub-beams. In this case, the grating lens 501 diverges the main beam $L_M$ to simultaneously form the sub-beams.

In FIGS. 3-5, the mobile robot 100 comprises a single processing unit 102 to diverge the main beam $L_M$ to a light 110, but the disclosure is not limited thereto. In another embodiment, a processing unit 108 can be added in the mobile robot 100 shown in FIGS. 3-5 to diverge the main beam $L_M$ to another light 120. The positions of the light emitting unit 101, the processing units 102 and 108 are adjusted to change the irradiative direction of the lights 110 and 120. For example, the light 110 or 120 covers an area in front of the mobile robot 100 or an area under the mobile robot 100.

In other embodiment, the mobile robot 100 may comprise two light emitting units and two processing units. The different processing units diverge the different main beams emitted by the different light emitting units. In another embodiment, the mobile robot 100 may comprise two light emitting units and one processing unit. The processing unit provides reflected beams extending to different directions according to the different main beams emitted by the different light emitting units. In this case, the light emitting units may simultaneously or may not simultaneously emit the corresponding main beam.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile robot, comprising:
   a light emitting unit emitting a main beam;
   a processing unit diverging the main beam to a plurality of sub-beams, wherein the sub-beams constitute a light covering an area, and when a portion of the sub-beams irradiate a first object, the first object reflects the sub-beams and a plurality of reflected beams are reflected;
   an optical component converging the reflected beams to a first collected beam;
   an image sensing unit converting the first collected beam into a first detection result;
   a control unit calculating depth information according to the first detection result; and
   a moving unit moving the mobile robot, wherein the control unit activates a relevant behavior of the mobile robot according to the depth information and controls the mobile robot through the moving unit.

2. The mobile robot as claimed in claim 1, wherein the light constructed by sub-beams is substantially parallel with the ground or floor plane.

3. The mobile robot as claimed in claim 1, wherein the processing unit emits the sub-beams toward the ground or toward the sky.

4. The mobile robot as claimed in claim 1, wherein the processing unit diverges the main beam to a plurality of sensing beams, some of sensing beams are diverged toward the ground and the other sensing beams are parallel with the ground.

5. The mobile robot as claimed in claim 4, wherein when a portion of the sensing beams irradiate a second object, the second object reflects the sensing beams and a plurality of ground-reflected beams are reflected, the optical component converges the ground-reflected beams to a second collected beam, the image sensing unit converts the second collected beam into a second detection result, and the control unit calculates second depth information according to the second detection result and adjusts a traveling path of the mobile robot via the moving unit.

6. The mobile robot as claimed in claim 1, wherein the light constructed by sub-beams is a plane light or a curvy light.

7. The mobile robot as claimed in claim 1, wherein the sub-beams are sequentially diverged by the processing unit.

8. The mobile robot as claimed in claim 1, wherein the sub-beams are simultaneously diverged by the processing unit.

9. The mobile robot as claimed in claim 1, wherein the processing unit reflects the main beam and the sub-beams are reflected.

10. The mobile robot as claimed in claim 9, wherein the processing unit comprises:
a base; and
a mirror connecting to the base to reflect the main beam, wherein the control unit rotates the base.

11. The mobile robot as claimed in claim 1, wherein the processing unit is a conical mirror.

12. The mobile robot as claimed in claim 1, wherein the processing unit refracts the main beam.

13. The mobile robot as claimed in claim 12, wherein the processing unit is a cylindrical lens.

14. The mobile robot as claimed in claim 13, wherein the cylindrical lens comprises a surface having a first area and a second area, the first area has a first reflective film, the second area has a second reflective film, and a thickness of the first reflective film is equal to a thickness of the second reflective film.

15. The mobile robot as claimed in claim 13, wherein the cylindrical lens comprises a surface having a first area and a second area, the first area has a first reflective film, the second area has a second reflective film, and a thickness of the first reflective film is different from a thickness of the second reflective film.

16. The mobile robot as claimed in claim 13, wherein the cylindrical lens comprises a surface having a reflective film formed by a deposition method.

17. The mobile robot as claimed in claim 1, wherein the processing unit diffracts the main beam.

18. The mobile robot as claimed in claim 17, wherein the processing unit is a grating lens.

19. The mobile robot as claimed in claim 1, wherein the light emitting unit comprises a laser emitter.

20. The mobile robot as claimed in claim 1, wherein the light constructed by sub-beams is similar to a line.

21. The mobile robot as claimed in claim 1, wherein the control unit stores at least one predefined relevant behavior, selects a predefined relevant behavior among the predefined relevant behavior according to the depth information or a fused result of the past depth information which is memorized in the control unit, serves the selected predefined relevant behavior as the relevant behavior of the mobile robot, determines the relevant behavior of the mobile robot according to the depth information and a random method, or determines the relevant behavior of the mobile robot according to the depth information and a control command, and an user directly or indirectly sets the control command.

22. The mobile robot as claimed in claim 21, wherein the mobile robot moves along a straight line, along the perimeter of an obstacle, or along a random route according to the predefined relevant behavior, and the mobile robot rotates along a fixed point according to the predefined relevant behavior, the mobile robot spirally rotates according to the predefined relevant behavior, the mobile robot rotates according to the predefined relevant behavior, the mobile robot increases the moving speed or reduces the moving speed according to the predefined relevant behavior or the mobile robot moves to go backward or stops moving according to the predefined relevant behavior.

23. The mobile robot as claimed in claim 1, wherein the sub-beams are formed as a continuous type or a discrete type.

24. The mobile robot as claimed in claim 1, wherein the control unit generates the relevant behavior according to the depth information.

25. The mobile robot as claimed in claim 24, wherein the relevant behavior is not predefined in the mobile robot.

\* \* \* \* \*